L. SMITH.
EXPOSURE TABLE.
APPLICATION FILED JAN. 24, 1920.

1,357,085.

Patented Oct. 26, 1920.

Inventor
Louis Smith

By Herbert E. Smith
Attorney

UNITED STATES PATENT OFFICE.

LOUIS SMITH, OF HILLYARD, WASHINGTON.

EXPOSURE-TABLE.

1,357,085.  Specification of Letters Patent.  Patented Oct. 26, 1920.

Application filed January 24, 1920. Serial No. 353,768.

*To all whom it may concern:*

Be it known that I, LOUIS SMITH, a citizen of the Dominion of Canada, a subject of the King of Great Britain, residing at Hillyard, in the county of Spokane and State of Washington, have invented certain new and useful Improvements in Exposure-Tables, of which the following is a specification.

The present invention relates to improvements in exposure tables designed for use especially by photographers in connection with the operation of cameras by means of which the required information for producing best results with respect to light and exposure is furnished in compact form, and carried on the camera as an attached part thereof. With this end in view the invention consists in certain novel combinations and arrangements of parts including data cards or sheets forming part of a packet, together with a packet receiver fixed to the camera to accommodate the packet, as will hereinafter be more fully explained and set forth in the claim.

In the utilization of the invention the data cards are used for furnishing information and guides as to light and exposure, in different conditions of weather in different times of the year, together with data as to sea level, altitudes, climatic conditions, &c., for use by the photographer and these data sheets or cards are compactly arranged and conveniently carried as a part of the camera for ready access by the photographer.

In the accompanying drawings I have illustrated one complete example of a preferred form of the invention, constructed and arranged according to the best mode I have so far devised for the practical application of the principles of the invention, adapted for use with a camera, but it will be understood that changes and alterations may be made within the scope of my claim without departing from the spirit of the invention.

Figure 1:
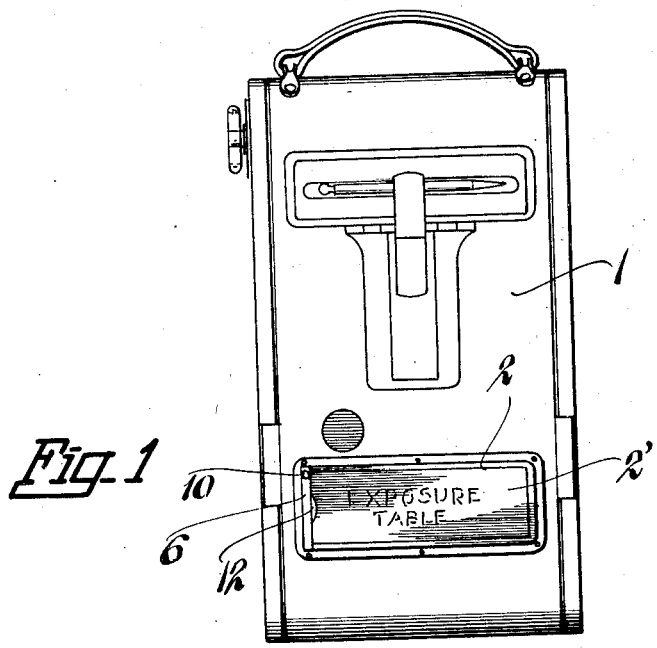
Figure 1 is a back view, in elevation of a camera with the device of my invention applied thereto.

The device of the invention is preferably attached to the back, as 1 of the camera, in the manner illustrated in Fig. 1 of the drawings, wherein a camera of usual or standard type is illustrated with the fixed pocket or packet receiver 2 attached thereto. The pocket is made up of sheet metal, and may be ornamental in an esthetic sense for enhancing the appearance of the camera, and includes a transparent plate or cover 2', the sheet metal structure being offset from the camera back in order to form a space therein for the reception and ready withdrawal of the packet.

Figure 2:
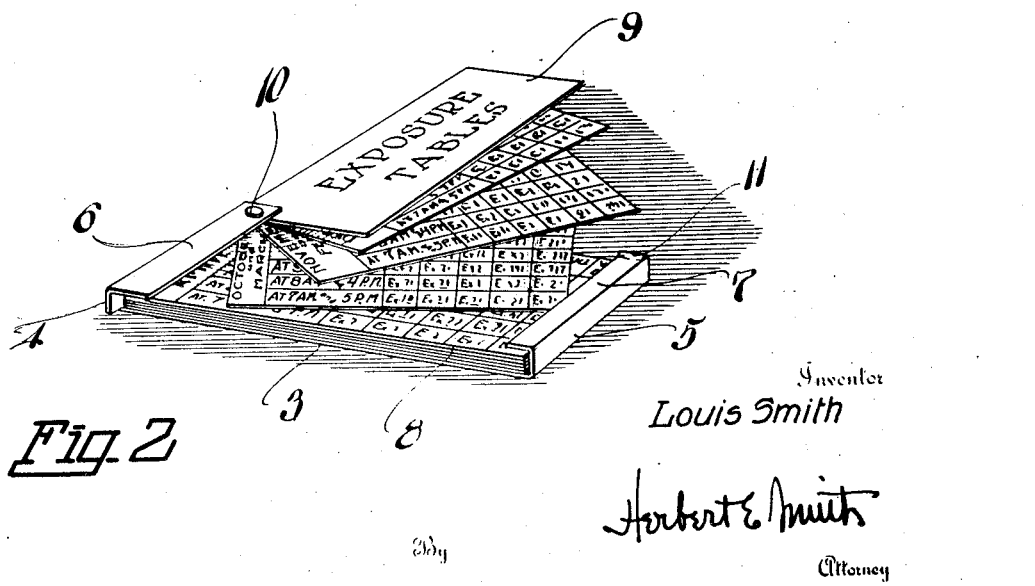
Fig. 2 is a perspective view of the packet and data cards, detached from the pocket or packet receiver for purposes of illustration.

In the perspective view of Fig. 2 the packet is best illustrated as comprising a base plate 3, preferably of sheet metal, and the one-piece device is fashioned with opposed turned up ends 4 and 5, and in turn each of these ends is formed with inwardly extending flanges 6 and 7 which lie parallel with the base plate 3.

A suitable or required number of data cards 8 are utilized, and made up of celluloid, paper, or thin metal, and these data cards are arranged, preferably in chronological order as to years and months, the months being designated at one end of the card, and the balance or remaining portion of the card is divided by intersecting columns forming squares in which are arranged figures or tables, giving tabulations regarding time or hours, together with data as to light and exposure for guiding the photographer.

The series of data cards is provided with a top plate or card for identification purposes as 9, and this card, together with the other cards of the series, are all perforated at one corner and pivoted on a common axis 10 in the form of a pivot pin extending through the base plate and the flange 6 at one corner of the base plate.

The ends of the cards are normally retained under the flanges 6 and 7, and the packet lies on the base plate in alinement with said plate with the ends thereof under the end flanges, but the cards are free to swing, individually or selectively on the common axis, as indicated in Fig. 2, when the packet is free or withdrawn from the receiver or pocket 2 of the camera.

The packet is adapted to slide into the receiver or pocket and may be withdrawn therefrom with facility when required, and when the cards, or card, are swung on their pivot the entering corner is guided under the flange 7 by means of an upturned guide lip 11 which turns upwardly from the opening under the flange.

In stowing away the packet, with all the data cards uniformly packed and retained in regular order in the packet beneath the end flanges, the packet is bodily inserted in the open, left end of the receiver, and slid along, with the base plate and flanges in frictional contact with the receiver and camera wall, until the parts are alined as in Fig. 1. To facilitate withdrawal of the packet a thumb or finger nail slot 12 is fashioned at the end of the cover plate 2' of the receiver for insertion of the edge of the nail and then the packet is pushed or shoved to the left in Fig. 1 until it is free from the receiver. When thus detached one or more cards may be selected from the packet and swung on the pivot 10 to position where it will be readily accessible for ready reference, and after the desired information has been acquired from the selected card, the latter may be swung back on its pivot to normal position, and the packet replaced in the receiver.

The cards, of course are of the proper length to permit them to swing on their pivot into and out of the packet, and the retaining flanges 6 and 7 prevent tearing or breaking of the ends of the cards, thus prolonging their life and adding to the durability of the device. The upturned or flared guide lip 11 on the flange 7 also facilitates the manipulation of the cards and insures their return to and entrances beneath the flange 7.

In this manner the camera is equipped with a useful and ornamental attachment that enhances the utility and appearance of the camera, and provides the photographer with a compact and readily accessible exposure table for use in connection with the operation of the camera.

What I claim is—

A packet formed with a base plate fashioned with upturned ends and inwardly extending retaining flanges, a series of data cards pivoted on a common center in one flange with their opposite ends under said inwardly extending flanges, and an upturned end on the flange at the opposite end of the base plate to guide the free ends of the cards.

In testimony whereof I affix my signature.

LOUIS SMITH.